United States Patent
Sailer et al.

(10) Patent No.: US 11,193,498 B2
(45) Date of Patent: Dec. 7, 2021

(54) TURBOCHARGER FOR AN INTERNAL COMBUSTION ENGINE

(71) Applicant: Bayerische Motoren Werke Aktiengesellschaft, Munich (DE)

(72) Inventors: Thomas Sailer, Pfaffenhofen a.d.Ilm (DE); Jan Velthuis, Pitzling Landsberg (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 326 days.

(21) Appl. No.: 16/449,993

(22) Filed: Jun. 24, 2019

(65) Prior Publication Data

US 2019/0368506 A1 Dec. 5, 2019

Related U.S. Application Data

(63) Continuation of application No. PCT/EP2018/051333, filed on Jan. 19, 2018.

(30) Foreign Application Priority Data

Jan. 27, 2017 (DE) ..................... 10 2017 201 293.5

(51) Int. Cl.
*F04D 29/40* (2006.01)
*F16L 23/00* (2006.01)
(Continued)

(52) U.S. Cl.
CPC ......... *F04D 29/403* (2013.01); *F01D 25/243* (2013.01); *F02B 39/005* (2013.01);
(Continued)

(58) Field of Classification Search
CPC ..... F04D 29/403; F16L 23/003; F16L 23/036; F02B 39/14; F02B 39/005; F02B 67/10; F01D 25/243; F05D 2260/33
See application file for complete search history.

(56) References Cited

U.S. PATENT DOCUMENTS 4,716,735 A * 1/1988 Ruf .................... F01D 25/24
180/291
6,915,634 B2 * 7/2005 Dumas .................. F02B 37/007
60/605.3
(Continued)

FOREIGN PATENT DOCUMENTS

CN 201407441 Y 2/2010
CN 105888820 A 8/2016
(Continued)

OTHER PUBLICATIONS

English Machine Translated Description for EP-2042706-A2 (Year: 2009).*

(Continued)

*Primary Examiner* — Nathan C Zollinger
(74) *Attorney, Agent, or Firm* — Crowell & Moring LLP

(57) ABSTRACT

A turbocharger for an internal combustion engine is provided. The turbocharger includes at least three connections for respective lines. The at least three connections are arranged on the same side of the turbocharger. The turbocharger is designed in such a manner that the lines can be mounted with a common screw to the at least three connections.

14 Claims, 1 Drawing Sheet

(51) Int. Cl.
*F16L 23/036* (2006.01)
*F02B 39/14* (2006.01)
*F02B 39/00* (2006.01)
*F01D 25/24* (2006.01)
*F02B 67/10* (2006.01)

(52) U.S. Cl.
CPC ............ *F02B 39/14* (2013.01); *F16L 23/003* (2013.01); *F16L 23/036* (2013.01); *F02B 67/10* (2013.01); *F05D 2260/33* (2013.01)

(56) References Cited

U.S. PATENT DOCUMENTS

| | | | |
|---|---|---|---|
| 7,302,800 | B2 | 12/2007 | Klingel |
| 8,997,487 | B2 * | 4/2015 | Drangel ............... F01D 25/125 60/605.3 |
| 9,677,473 | B2 * | 6/2017 | Dartnell .................... F02C 6/12 |
| 10,794,269 | B2 * | 10/2020 | Eriksson .................... F01P 3/20 |
| 2004/0040300 | A1 | 3/2004 | Klingel |
| 2005/0268602 | A1 * | 12/2005 | Smatloch .............. F16L 23/032 60/323 |
| 2007/0056283 | A1 | 3/2007 | Klingel |
| 2009/0151327 | A1 * | 6/2009 | Zimmermann ......... F02B 67/10 60/280 |
| 2013/0269340 | A1 | 10/2013 | Schumacher et al. |
| 2020/0041053 | A1 * | 2/2020 | Platova .................. F01D 25/24 |

FOREIGN PATENT DOCUMENTS

| | | | | |
|---|---|---|---|---|
| CN | 103375247 B | | 7/2017 | |
| DE | 3533419 A1 | * | 3/1987 | ........... H05K 5/0204 |
| DE | 10 2007 046 687 A1 | | 4/2009 | |
| DE | 10 2012 025 048 A1 | | 6/2014 | |
| EP | 1 433 930 A1 | | 6/2004 | |
| EP | 2042706 A2 | * | 4/2009 | .............. F02B 67/10 |
| JP | 9-310620 A | | 12/1997 | |
| WO | WO 2011/091129 A2 | | 7/2011 | |

OTHER PUBLICATIONS

English Machine Translated Abstract for DE-3533419-A1 (Year: 1987).*
Chinese-language Office Action issued in Chinese Application No. 201880005131.5 dated Aug. 25, 2020 with English translation (11 pages).
International Search Report (PCT/ISA/210) issued in PCT Application No. PCT/EP2018/051333 dated Mar. 12, 2018 with English translation (four (4) pages).
German-language Written Opinion (PCT/ISA/237) issued in PCT Application No. PCT/EP2018/051333 dated Mar. 12, 2018 (five (5) pages).
German-language Search Report issued in counterpart German Application No. 10 2017 201 293.5 dated Nov. 24, 2017 with partial English translation (11 pages).
German-language Office Action issued in counterpart German Application No. 10 2017 201 293.5 dated Nov. 23, 2018 (six (6) pages).

* cited by examiner

TURBOCHARGER FOR AN INTERNAL COMBUSTION ENGINE

CROSS REFERENCE TO RELATED APPLICATIONS

This application is a continuation of PCT International Application No. PCT/EP2018/051333, filed Jan. 19, 2018, which claims priority under 35 U.S.C. § 119 from German Patent Application No. 10 2017 201 293.5, filed Jan. 27, 2017, the entire disclosures of which are herein expressly incorporated by reference.

BACKGROUND AND SUMMARY OF THE INVENTION

The invention relates to a turbocharger for an internal combustion engine, especially for a motor vehicle.

Modern motor vehicles generally have a turbocharger with which air can be compressed before it is introduced into combustion chambers of an internal combustion engine of the motor vehicle. In this way, the performance of the internal combustion engine can be boosted by increasing the amount of oxygen available in the combustion chambers.

In known turbochargers it is usually necessary to mount in particular a shaft of the turbocharger in oil. For this, in particular known turbochargers usually have an oil connection. There are also turbochargers which are further cooled with water. For this, these turbochargers have connections by way of which water can be conveyed through cooling lines inside the turbocharger.

In known turbochargers with multiple oil or water connections, the installation and removal of the turbocharger is often expensive. Multiple lines need to be connected to the turbocharger or removed from it. This is often complicated by the fact that the turbocharger is situated in the engine compartment of the motor vehicle closely adjacent to other components. Depending on the arrangement of the connections for oil and water, costly routing of the corresponding lines through the engine compartment may also be required. This may also complicate the installation or removal of the turbocharger.

Starting from this, a problem which the invention proposes to solve is to solve or at least lessen the technical problems described in connection with the prior art. In particular, a turbocharger for an internal combustion engine should be presented which is especially easy to install.

This and other problems are solved with a turbocharger for an internal combustion engine according to embodiments of the invention. Further advantageous configurations of the turbocharger are also provided. The individual features presented in the patent claims may be combined with each other in any way that makes technological sense and may be supplemented with the information contained in the specification, wherein further variant embodiments of the invention are indicated.

According to an embodiment of the invention, a turbocharger for an internal combustion engine is presented. The turbocharger comprises at least three connections for respective lines, the at least three connections being arranged on the same side of the turbocharger and the turbocharger being designed such that the lines can be mounted at the at least three connections with a single common screw.

In particular, the internal combustion engine may be suitable for a motor vehicle. The internal combustion engine preferably comprises multiple cylinders as combustion chambers, in which fuel can be burned with air. Preferably, air can be introduced into the combustion chambers from the surroundings of the internal combustion engine via an intake pipe. Preferably, air can be compressed via the turbocharger. The turbocharger is preferably driven by way of the exhaust gas of the internal combustion engine (exhaust gas turbocharger). For this, the turbocharger preferably has an exhaust gas zone, which is integrated in an exhaust gas system of the internal combustion engine and within which the exhaust gas can bring about a driving of the turbocharger. Furthermore, the turbocharger preferably has a compression zone, which is integrated in the intake pipe of the internal combustion engine and within which air can be compressed. The exhaust gas zone of the turbocharger preferably comprises at least one exhaust gas turbine, which can be driven by the exhaust gas. A rotational movement of the exhaust gas turbine which is produced in this way is preferably transmitted by a drive shaft to a compression device in the compression zone of the turbocharger. The air in the compression zone can be compressed by way of the compression device.

The at least three connections may serve in particular for the cooling and lubrication of the turbocharger. Preferably a coolant (such as water for example) and/or a lubricant (such as oil for example) can be introduced into the turbocharger and/or removed from it via the corresponding lines. For this, cooling lines and/or lubricating lines, which are connected to the connections, are preferably provided within the turbocharger.

In the installed state, the lines are preferably attached to the respective corresponding connections. An especially easy installation of the turbocharger can be made possible in that the at least three connections are arranged on the same side of the turbocharger. In particular, it is therefore no longer necessary to lead the lines around the turbocharger. Such an arrangement of the connections on the same side of the turbocharger can be assisted, in the turbocharger being described, in that the corresponding lines are held by the common screw. For example, if each line were to be held by its own screw, it might be necessary for installation reasons to space the connections further apart from each other and in particular to arrange them on different sides of the turbocharger.

Preferably, the at least three connections are arranged in a common plane, the three connections being formed by openings in a flat surface of a housing of the turbocharger. In this case, an arrangement on the same side of the turbocharger is to be understood as meaning that the at least three connections are formed in the same flat surface of the housing.

Even if the at least three connections are not arranged in a common flat surface, the at least three connections can be arranged on the same side of the turbocharger in the sense of the definition used here. Preferably, the at least three connections are arranged such that the corresponding lines run parallel to each other in the installed state. The term parallel running lines is to be understood here as meaning that the lines run parallel at least in the immediate vicinity of the at least three connections. Thus, if a line is attached to a connection arranged laterally on the turbocharger and this line runs from a bend in the line in parallel with a line attached to a connection on a top side of the turbocharger, these lines do not run parallel to each other in the immediate vicinity of the connections.

Even if the lines do not run parallel as described, the at least three connections can be arranged at the same side of the turbocharger in the sense of the definition used here. For this, the turbocharger is divided by an imaginary plane which encompasses the center of gravity of the turbocharger or in any case that of a component of the turbocharger, such as a bearing housing between the compression zone and the exhaust gas zone for example. If there exists at least one such plane in which the at least three connections are arranged on the same side of the plane, these connections are viewed as being arranged on the same side of the turbocharger.

The lines can be mounted at the at least three connections with the common screw. In the mounted state, the lines are preferably held by the common screw on the respective corresponding connections. Owing to the use of the common screw for the lines, it is enough to tighten or loosen the single common screw when installing or removing the turbocharger. It is not necessary to tighten or loosen a single screw for each line.

In one preferred embodiment of the turbocharger, the at least three connections are arranged on a bearing housing of the turbocharger.

The bearing housing is preferably arranged between the exhaust gas zone and the compression zone of the turbocharger and preferably comprises at least the drive shaft of the turbocharger. The bearing housing may also be called a bearing block. In another definition of the terminology, the bearing housing comprises one or more bearing blocks. An arrangement of the at least three connections on the bearing housing means here that the at least three connections are arranged on an exterior side of a housing at a location of the turbocharger where the drive shaft runs inside the housing. This means, in particular, that the at least three connections are preferably arranged between the drive turbine and the compression device.

A cooling and/or a mounting of the drive shaft in oil is especially preferred in the vicinity of the drive shaft and thus in particular inside the bearing housing. In this configuration, the at least three connections are arranged on the bearing housing of the turbocharger for this purpose.

In another preferred embodiment of the turbocharger, at least a first one of the connections has a protrusion beneath which a first flange of a first of the lines can engage in the manner of a bayonet lock.

A flange of a line is preferably to be understood as meaning a plate which is embodied so as to run around the end of the line (which is attached to the turbocharger). The flange is preferably situated at the end of the line, (at least substantially) perpendicular to the line.

Preferably, the first line is not fitted onto the first connection in the orientation in which the first line is present in the mounted state. Instead, it is preferable for the first line to be fitted onto the first connection and then to be rotated through an angle of at least 90°, especially at least 130°, about an axis of the first line. Owing to the rotation of the first line, a portion of the first flange preferably engages beneath the protrusion of the first connection. As long as the first line is not rotated back from this position, the first line is secured by the first flange and the protrusion is secured on the first connection. Preferably, the first flange is not designed so as to be rotationally symmetrical about the first line, but instead has an asymmetry. In this way, the first flange can be moved past the protrusion when the first line is fitted onto the first connection. Only by rotating the first line is the flange engaged beneath the protrusion.

A bayonet lock between a line and a connection is to be understood as meaning that the line is fitted onto the connection and can be secured on the connection by rotation. In the case of the described turbocharger, the bayonet lock is preferably realized by the first flange, which engages beneath the protrusion by rotation of the first line and thus can secure the first line on the first connection.

In another preferred embodiment of the turbocharger, a thread for the common screw is provided between a second one of the connections and a third one of the connections.

Owing to the common screw, preferably at least the second line and the third line are held on the respective corresponding connections. Consequently, the arrangement of the thread between the second connection and the third connection is advantageous. The thread is preferably formed in the material of the bearing housing.

In another preferred embodiment of the turbocharger, the first connection and the third connection are designed as water connections for a cooling of the turbocharger, wherein the second connection is designed as an oil connection for a lubrication of the turbocharger.

During the operation of the turbocharger, the drive shaft rotates at a high speed. In particular, it is therefore preferable for the drive shaft at least to be mounted in oil. Oil may also serve for cooling in the turbocharger. Preferably, oil can be supplied to the turbocharger via the second connection, designed as an oil connection. For example, oil can be introduced into the turbocharger from an oil sump of the internal combustion engine or from a special oil reservoir via the oil connection. Furthermore, the turbocharger may have an oil outlet, by way of which the oil can be removed once more from the turbocharger in order to be returned once more to the oil sump or the oil reservoir, for example. Alternatively, the second connection designed as an oil connection preferably serves as the outlet of the oil from the turbocharger. In this case, the turbocharger preferably has an oil inlet as well. The second connection designed as an oil connection can also serve for the inlet of oil into the turbocharger and (at a different time) the outlet of oil from the turbocharger.

The cooling of the turbocharger preferably occurs at least partly by a water cooling. For this, the turbocharger preferably has a cooling line which extends between the first connection and the third connection. The turbocharger is preferably integrated in a cooling circuit of the motor vehicle via the first connection and the third connection. In the cooling circuit, cooling water can be circulated for example (possibly with an additive such as antifreeze for example). The cooling circuit preferably has at least one radiator by way of which the coolant can be cooled.

In another preferred embodiment of the turbocharger, a second of the lines is attached to the second connection and a third of the lines to the third connection, the second line having a second flange and the third line having a third flange, and wherein the second flange and the third flange overlap such that the second line and the third line are held by the common screw on the turbocharger.

In the mounted state, the second flange preferably lies at least partly against the third flange. The common screw is preferably arranged in the area in which the second flange and the third flange overlap by this abutment. The common screw preferably extends through the second flange and the third flange as far as the thread in the bearing housing of the turbocharger. The second and the third line are held by the common screw. In this way, these two lines can be attached to the turbocharger or released from it by tightening or loosening the common screw.

The second connection and the third connection are preferably arranged such that a thickness of the flange situated closer to the bearing housing is equalized. For example, if the second flange lies against the bearing housing, the third connection is preferably staggered relative to the second connection by the thickness of the second flange, so that the third flange can lie at least partly against the second flange.

In another preferred embodiment of the turbocharger, the first line is attached to the first connection, the first flange and the second flange being formed such that the first flange is held in a rotationally fixed manner at least by the second flange, so that the bayonet lock of the first line cannot be released for as long as the second line is attached to the second connection.

In this embodiment, the respective corresponding lines are preferably attached to all of the at least three connections. Preferably, the first connection and the second connection are arranged so that the first flange and the second flange lie in a plane in the mounted state present here. Furthermore, preferably the first flange and the second flange lie at least partly against each other laterally so that the first flange cannot be rotated. In this case, the first line is held in a rotationally fixed manner. In particular, preferably the first line cannot be rotated when the first line is oriented such that it is held by the bayonet lock (thus, the first flange engages beneath the protrusion of the first connection) and when the second line is fitted onto the second connection. In this way, the first line can be held by the common screw on the first connection, indirectly mediated by the second flange. Hence, the respective corresponding lines can be fixed to all of the at least three connections with the common screw.

As a further aspect, a method is presented for the mounting of the lines on the described turbocharger, involving at least the following method steps:
a) fitting of the first line onto the first connection,
b) rotating of the first line so that the first line is held on the first connection in the manner of a bayonet lock,
c) fitting of the second line onto the second connection, so that the first flange is held in a rotationally fixed manner by the second flange,
d) fitting of the third line onto the third connection, and
e) tightening of the common screw so that the second line and the third line are held by the common screw.

The special benefits and design features described above for the turbocharger are applicable and transferable to the described method, and vice versa.

The described method steps are preferably performed in the indicated sequence. In order to remove the lines from the turbocharger once again, the indicated steps are preferably correspondingly performed in the reverse sequence. A corresponding embodiment is to be understood as meaning for example that the common screw is loosened and not tightened in step e) and that the lines are pulled off and not fitted on.

The invention finds particular use in a motor vehicle with at least one turbocharger designed as described above.

The special benefits and design features described above for the turbocharger and for the method are applicable and transferable to the described motor vehicle.

The invention and the technical field shall be explained more closely below with the aid of the figures. The figures show especially preferred exemplary embodiments, although the invention is not limited to them. In particular, it is to be pointed out that the figures and especially the proportions illustrated are merely schematic.

Other objects, advantages and novel features of the present invention will become apparent from the following detailed description of one or more preferred embodiments when considered in conjunction with the accompanying drawings.

DETAILED DESCRIPTION OF THE DRAWINGS

Figure 1:
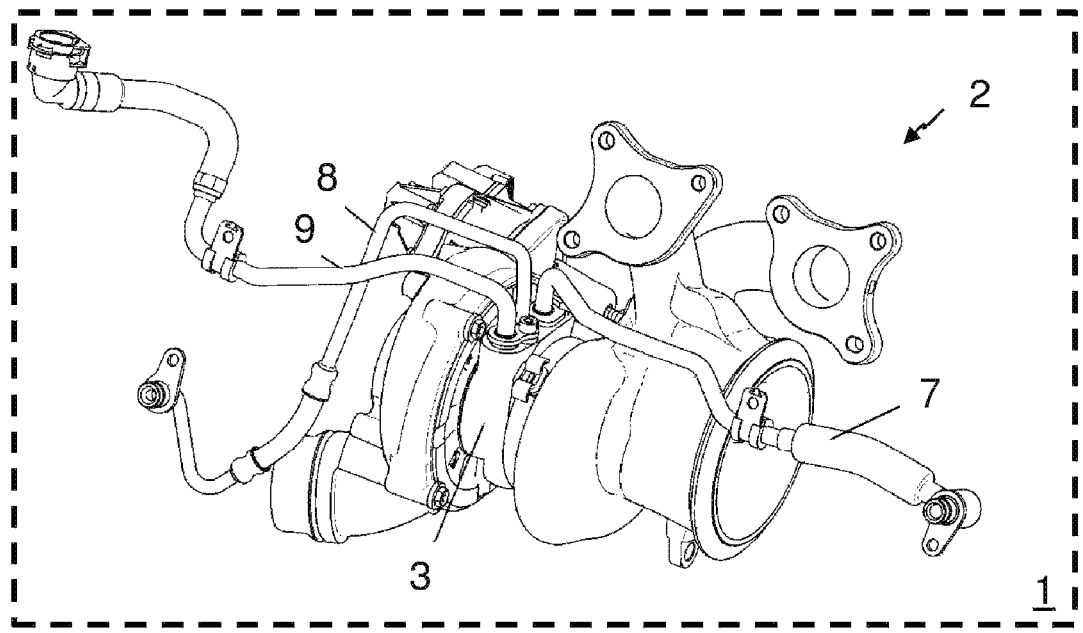
FIG. 1 is a schematic representation of a motor vehicle with a turbocharger.

FIG. 1 shows a motor vehicle 1 with a turbocharger 2 for an internal combustion engine (not shown). Attached to a bearing housing 3 of the turbocharger 2 are a first line 7, a second line 8 and a third line 9. Cooling water for the cooling can be conducted via the first line 7 and the third line 9 through the turbocharger 2. Oil for the mounting of a drive shaft (not shown) can be supplied via the second line 8 to the turbocharger 2.

Figure 2:
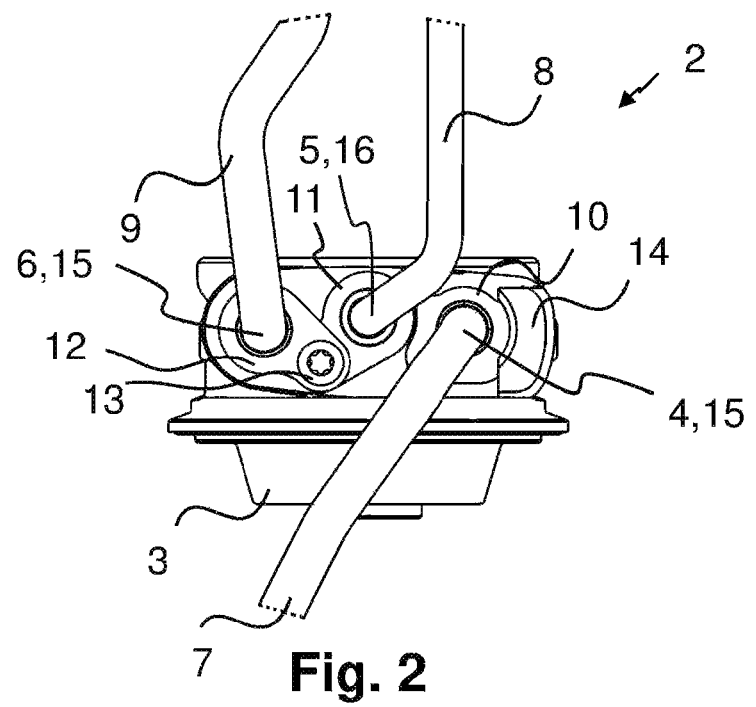
FIG. 2 is a top view of the turbocharger of FIG. 1.

FIG. 2 shows a top view of a portion of the turbocharger 2 of FIG. 1. In particular, the bearing housing 3 of the turbocharger 2 can be seen. On the depicted side of the bearing housing 3 are arranged a first connection 4, a second connection 5 and a third connection 6. The first line 7 is attached to the first connection 4. A first flange 10 of the first line 7 engages beneath a protrusion 14 of the first connection 4 in the manner of a bayonet lock. The second line 8 has a second flange 11. The third line 9 has a third flange 12. The second flange 11 and the third flange 12 overlap such that the second line 8 and the third line 9 are held by a common screw 13 on the turbocharger 2. A thread for the common screw 13 is provided between the second connection 5 and the third connection 6.

The first flange 10 and the second flange 11 are formed such that the first flange 10 is held in a rotationally fixed manner at least by the second flange 11, so that the bayonet lock of the first line 7 cannot be released for as long as the second line 8 is attached to the second connection 5.

The first connection 4 and the third connection 6 are designed as water connections 15 for a cooling of the turbocharger 2. The second connection 5 is designed as an oil connection 16 for a lubrication of the turbocharger 2.

LIST OF REFERENCE SYMBOLS

1 Motor vehicle
2 Turbocharger
3 Bearing housing
4 First connection
5 Second connection
6 Third connection
7 First line
8 Second line
9 Third line
10 First flange
11 Second flange
12 Third flange
13 Common screw
14 Protrusion
15 Water connection
16 Oil connection The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A turbocharger for an internal combustion engine, comprising:
   at least three connections for respective lines,
   wherein
      the at least three connections are arranged on the same side of the turbocharger and are arranged to receive the respective lines at an external surface of the turbocharger,
      the respective lines are separate from one another and have individual flanges, where at least one of the individual flanges is configured to cooperate with the turbocharger to retain another one of the individual flanges on the turbocharger, and
      the turbocharger is designed such that the respective lines are mountable at the at least three connections with a single common screw at the external surface of the turbocharger.

2. The turbocharger according to claim 1, wherein the at least three connections are arranged on a bearing housing of the turbocharger.

3. The turbocharger according to claim 1, wherein at least a first one of the at least three connections has a protrusion beneath which a first flange of the individual flanges of a first of the lines is engageable in the manner of a bayonet lock.

4. The turbocharger according to claim 2, wherein at least a first one of the at least three connections has a protrusion beneath which a first flange of the individual flanges of a first of the lines is engageable in the manner of a bayonet lock.

5. The turbocharger according to claim 3, wherein a thread configured to receive the common screw is provided between a second one of the connections and a third one of the connections.

6. The turbocharger according to claim 4, wherein a thread configured to receive the common screw is provided between a second one of the connections and a third one of the connections.

7. The turbocharger according to claim 5, wherein
   the first connection and the third connection are designed as water connections for a cooling of the turbocharger, and
   the second connection is designed as an oil connection for a lubrication of the turbocharger.

8. The turbocharger according to claim 6, wherein
   the first connection and the third connection are designed as water connections for a cooling of the turbocharger, and
   the second connection is designed as an oil connection for a lubrication of the turbocharger.

9. The turbocharger according to claim 5, wherein
   a second of the lines is attached to the second connection and a third of the lines is attached to the third connection, where the second line has a second flange of the individual flanges and the third line has a third flange of the individual flanges, and
   the second flange and the third flange overlap such that the second line and the third line are held by the common screw on the turbocharger.

10. The turbocharger according to claim 8, wherein
    a second of the lines is attached to the second connection and a third of the lines is attached to the third connection, where the second line has a second flange of the individual flanges and the third line has a third flange of the individual flanges, and
    the second flange and the third flange overlap such that the second line and the third line are held by the common screw on the turbocharger.

11. The turbocharger according to claim 9, wherein
    the first line is attached to the first connection, and
    the first flange and the second flange are formed such that the first flange is held in a rotationally fixed manner at least by the second flange, so that the bayonet lock of the first line cannot be released for as long as the second line is attached to the second connection.

12. The turbocharger according to claim 10, wherein
    the first line is attached to the first connection, and
    the first flange and the second flange are formed such that the first flange is held in a rotationally fixed manner at least by the second flange, so that the bayonet lock of the first line cannot be released for as long as the second line is attached to the second connection.

13. A method for mounting the lines on the turbocharger according to claim 11, the method comprising the following acts of:
    a) fitting the first line onto the first connection;
    b) rotating the first line so that the first line is held on the first connection in the manner of a bayonet lock;
    c) fitting the second line onto the second connection, so that the first flange is held in a rotationally fixed manner by the second flange;
    d) fitting the third line onto the third connection; and
    e) tightening of the common screw so that the second line and the third line are held by the common screw.

14. A motor vehicle comprising:
    at least one turbocharger according to claim 1.

* * * * *